United States Patent [19]
Hart et al.

[11] Patent Number: 5,716,027
[45] Date of Patent: Feb. 10, 1998

[54] RETROFIT LUGGAGE BIN ASSEMBLIES COMPATIBLE WITH EXISTING AIRCRAFT BIN SUPPORTS

[75] Inventors: Jack E. Hart, Bellevue; Ralph M. Burrows, Bellingham; Michael E. Marquardt, Seattle, all of Wash.

[73] Assignee: Hexcel Corporation, Pleasanton, Calif.

[21] Appl. No.: 516,908

[22] Filed: Aug. 18, 1995

Related U.S. Application Data

[63] Continuation-in-part of Ser. No. 363,765, Dec. 23, 1994, Pat. No. 5,549,258.

[51] Int. Cl.⁶ .................................................. B64C 1/22
[52] U.S. Cl. .............................. 244/118.1; 244/118.5
[58] Field of Search .......................... 244/118.1, 118.2, 244/118.5, 119, 129.1; 312/101, 140, 242, 245, 246, 293; 248/121, 122, 200, 223.3; 108/42, 48

[56] References Cited

U.S. PATENT DOCUMENTS 4,799,631  1/1989  Humphries et al. .................. 244/118.5

Primary Examiner—Andres Kashnikow
Assistant Examiner—Tien Dinh
Attorney, Agent, or Firm—Christensen O'Connor Johnson & Kindness

[57] ABSTRACT

The invention provides luggage bin assemblies, for retrofitting existing aircraft with larger overhead storage bins, that are compatible with existing aircraft bin support structure for original equipment bins. The assemblies include both a bin structure and supporting brackets that engage the existing aircraft bin supports with little or no modification to the existing supports. This facilitates rapid retrofit of the aircraft, thereby reducing aircraft out-of-service time and also costs of manpower used to retrofit the aircraft.

22 Claims, 10 Drawing Sheets

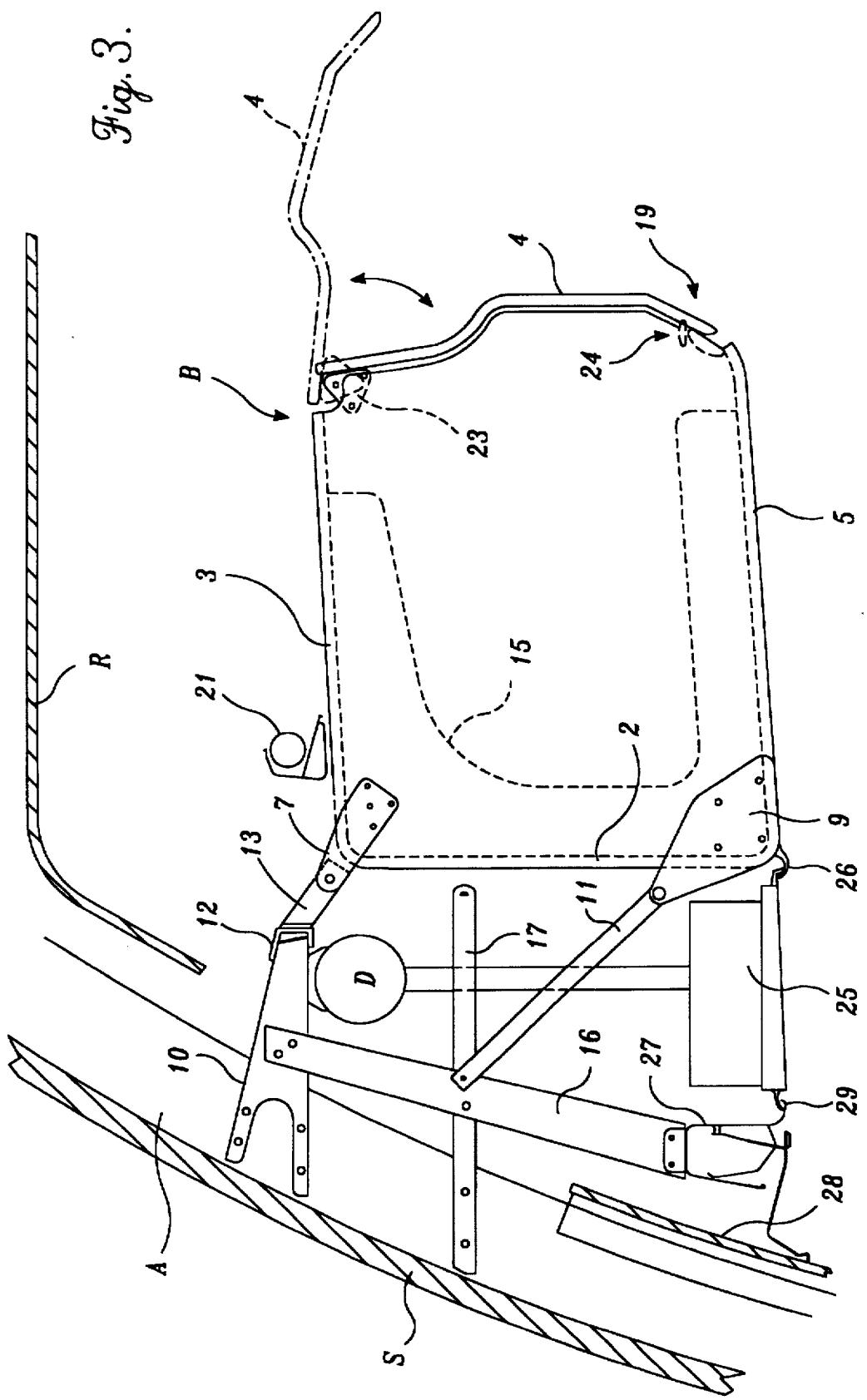

RETROFIT LUGGAGE BIN ASSEMBLIES COMPATIBLE WITH EXISTING AIRCRAFT BIN SUPPORTS

STATEMENT OF RELATED CASES

This application is a continuation-in-part of U.S. Ser. No. 08/363,765 filed Dec. 23, 1994 and issued as U.S. Pat. No. 5,549,258.

FIELD OF THE INVENTION

The invention relates to overhead luggage bins used in aircraft for storing the carry-on luggage of passengers. More specifically, the invention provides a luggage bin assembly compatible with the existing bin support structure of aircraft to permit ready retrofitting of the aircraft with bins of larger volume and more modern design.

BACKGROUND OF THE INVENTION

Passenger aircraft, as originally equipped, include overhead bins for the storage of passenger carry-on luggage. Usually, these bins are located overhead on either side of the aisle, above the passenger seating space. In larger, widebodied aircraft, such as the Boeing 747, luggage bins are also provided above the central passenger seating space, in order to provide additional luggage storage capacity. Typically, passenger service units, air conditioning ducting, and emergency equipment for breathing are located in close proximity to the overhead bins.

In recent years, passengers have increasingly tended to travel with larger amounts of carry-on luggage, thereby placing a premium on available overhead luggage bin storage space. Because a large proportion of the world's existing aircraft fleet was built before this growing demand for carry-on luggage space, airlines using these aircraft find themselves in a less competitive position as compared to airlines using more modern aircraft that are equipped with larger original-equipment overhead bins. While airlines using these older aircraft have an identified need to upgrade and expand their carry-on luggage capacity to meet passenger demands, existing methods and retrofit assemblies for expanding carry-on luggage capacity are expensive, requiring lengthy aircraft out-of-service time. A standard type of aircraft retrofit would therefore significantly impact the costs and revenues of airlines, which frequently are already faced with thin profit margins due to intense competition in the industry.

Airlines that have aircraft with limited overhead storage space require an overhead luggage bin retrofit assembly that is rapid to install, thereby reducing aircraft out-of-service time and manpower costs; requires minimal, if any, modification to the existing aircraft bin support structure to support larger replacement luggage bins; and that meets all applicable regulatory safety requirements.

SUMMARY OF THE INVENTION

The invention provides an aircraft overhead luggage bin retrofit assembly that is compatible with existing bin support structures in an aircraft cabin. Further, the aircraft retrofit assembly of the invention provides ease of installation so that the downtime for retrofitting an aircraft with larger replacement overhead bins on the sides and in the center of the cabin is significantly reduced.

Advantageously, the replacement overhead bins are usually larger than the original equipment bins and have large bin doors for ease of stowing and removal of luggage. Moreover, the bins are designed to reduce the risk of luggage spilling from the bins when they are opened after flight, because of luggage movement during flight.

The aircraft luggage bin retrofit assemblies of the invention include mounting assemblies for the luggage bins that are designed to be compatible with the existing support structure for the original equipment bins in the aircraft. For such compatibility, for side bin replacement in accordance with the invention, the existing original equipment bin support structure of the aircraft should include existing upper support brackets attached to the aircraft frame and extending transversely in an inboard direction. Existing continuous rails are attached to inboard ends of these upper support brackets to sustain forward and aft loading. Directly beneath the upper support brackets are lower support brackets, also attached to the aircraft frame and extending inboard. Both the upper and lower support brackets described are found, for example in Boeing 747 aircraft, and they are typically spaced 40 inches apart along the sides of the passenger cabin. Usually, retrofitting with larger bins requires removal of these supports and replacing them with new supports. This is the biggest of the individual tasks required in current retrofits. Consequently, the invention, which retains these existing supports, provides large installation time savings and significantly reduces costs.

In one embodiment of the invention, the replacement side luggage bin has a mounting assembly, mechanically attached to the bin, that is designed for fixed mechanical attachment to the bin support structure for the original equipment bin. The mounting assembly includes an upper bin end support bracket, mechanically attached near the upper rear portions of the bulkheads on either end of the replacement bin. These upper bin end support brackets extend rearward of the bin, and have end portions farthest from the bin that are adapted for mechanical attachment to a rail-cooperating bracket, which is part of the retrofit assembly, and that is adapted for mechanical attachment to a rail that extends along the length of the aircraft cabin. This rail, which may be an already existing rail, or a replacement reinforced rail, is in turn supported and mechanically attached to the existing upper support brackets of the aircraft, which were used for supporting the original bin. The mounting assembly also includes a lower bin end support bracket, mechanically attached to the bin at or near each bulkhead at the ends of the bin, near a base portion of the bin. A portion of the lower bin end support bracket extends rearwardly from the bin and is adapted for mechanical attachment to a vertical bracket, which also forms part of the mounting assembly of the invention. The vertical bracket, adapted for being mounted in a substantially vertical orientation, has an upper end adapted for mechanical attachment to the existing upper support bracket, and a midportion adapted for mechanical attachment to the existing lower support bracket. Further, a lower end of the vertical support bracket is adapted for mechanical attachment to the rearward extending portion of the lower bin end support bracket.

Depending upon the size and capacity of the replacement bins, the mounting assembly for side bins, described above, may not be adequate for support. Consequently, in addition to the bin upper and lower end support brackets, intermediate upper and lower support brackets may also be used, in conjunction with intermediate bin bulkheads, railcooperating brackets and vertical support brackets. Generally, intermediate bulkheads are located in the replacement bins at spacings that accommodate the existing support bracket spacings, usually multiples of 40 inches, typically spacings of either 40, 80, or 120 inches. These spacings correspond with the spacings between the existing upper support brackets and the spacings between existing lower support brackets, designed to support the original bins. When an intermediate support is required, an intermediate upper support bracket is mechanically attached to the bin at a juncture coincident with an intermediate bulkhead of the bin, so that the support bracket is securely fastened. The intermediate upper support bracket extends upward and rearward from the bin for attachment to a rail-cooperating bracket, which is attached to the rail that extends along the length of the aircraft cabin. Likewise, the base portion of the bin is supported by intermediate lower support brackets, mechanically attached to lower portions of the bin at junctures coincident with intermediate bulkheads of the bin. The lower support brackets extend rearward of the bin for attachment to a vertical support bracket, which forms part of the retrofit mounting assembly.

In an alternate embodiment of the side bin retrofit assembly of the invention, the one-piece vertical bracket may be replaced by two generally elongate brackets, the first of these two brackets having an upper end adapted for mechanical attachment to the existing upper support bracket, a midportion adapted for attachment to the existing lower support bracket, and a lower end portion adapted for mechanical attachment thereto of the air conditioning ducts that support the outboard ends of the passenger service units. The second of these generally elongate brackets has one end adapted for attachment to the existing lower support bracket, and another end adapted for mechanical attachment to the rearwardly extending portions of the lower bin support brackets, and the intermediate lower support brackets.

A further alternate embodiment of the side bin retrofit assembly of the invention may be used when the capacity of the retrofit luggage bins permits the stowage of a mass of luggage that does not require as much support structure as in the embodiment described above. In this instance, the retrofit bin is adapted for mechanical attachment, at a point on the upper portion of the rear of the bin, to the rail and existing upper support brackets. An extension bracket projecting from inboard end portions of the existing lower support brackets has a nose portion angled for supporting the rear side of the replacement luggage bin, and is mechanically attached to the rear of the luggage bin to provide further support.

As a result of the side bin retrofit of the invention, passenger service units and air conditioning ducts must be relocated. According to the invention, an outboard end of the passenger service unit is mounted to an existing supporting rail extension on the air conditioning duct and an inboard end thereof is mounted on a rail integral with and extending along the rear base of the retrofit bin. The air conditioning duct, and hence the outboard passenger service unit supports, is held in place by a vertical bracket that has one end adapted for attachment to the air conditioning duct, a midportion for attachment to the existing lower support bracket of the aircraft, and an upper end adapted for fixed attachment to the existing upper support bracket of the aircraft.

The invention also provides overhead centerline bin retrofit assemblies that are compatible with the existing centerline bin support structure in an aircraft cabin. The existing support structure usually includes a longitudinally extending rectangular box beam assembly that is centrally mounted to the aircraft frame and extends downward into the cabin. The beam assembly includes four substantially parallel bin mounting rails, arranged in a rectangular array, extending longitudinally along the length of the aircraft cabin. At spaced intervals, vertical bulkheads are attached to upper mounting rails of the beam assembly and are in turn structurally attached to the aircraft frame by struts. Further, the lower pair of rails is fixedly supported from the upper pair of rails by a series of spaced-apart vertical rectangular brackets with upper corners attached to the upper rails and lower corners attached to the lower rails. Usually, centerline bin buckets are pivotally mounted onto shrouds which are mechanically attached to the box beam assembly rails by means of brackets at the upper rail attachments and direct mechanical fasteners at the lower rail attachments. The pivotally attached bin buckets open downward to allow luggage to be placed in, or removed from, the bin.

In one embodiment of the invention, the existing centerline bin mounting structure, described above, and bin shrouds are retained, but the bin buckets are replaced with larger volume buckets. It is an important feature of these replacement bin buckets that the front side is at an acute angle to the base of the bucket, thereby forming a catchment pocket behind the front side to prevent inadvertent spillage of loose luggage from the bucket onto passengers, when the bucket is opened.

In another embodiment, the replacement centerline luggage bin is also of the shroud and bucket-type design with a shroud that is made of a continuous thin, lightweight structural panel. The shroud is attached, at an upper rear portion, to the existing upper bin mounting rail on the box beam assembly, and extends outboard and downward in a smooth curvature to a lip formed at the front edge of the shroud. The bucket, hingedly cooperating with the shroud, has a flat base portion and a front side at an acute angle to the base and coextensive with the base. The upper end of the front side has a lip that mates with the lip of the shroud so that a continuous smooth curvature continues from the shroud to the from side of the bucket. Importantly, as described above, the front side of the bucket is at an acute angle to the base so that, when the bucket is opened, a catchment pocket is formed behind the front side to prevent inadvertent spillage of loose luggage from the bucket onto passengers.

In another embodiment, the invention provides replacement centerline bins of larger volume than original equipment bins and mounted so that the base and opening for luggage are at lower elevation than the original bins, for ease of passenger use. These fixed shelf-type bins include a hinged front door that allows access to the interior luggage space. The lower elevation of the bins is achieved by installing an upper bin spacer support bracket with an upper portion mechanically attached to the existing upper bin support rail of the aircraft and a lower portion mechanically attached near the top of the replacement bin. This spacer bracket allows adjustment of the elevation at which the replacement bin is mounted. The rear of the bin is mechanically attached to the existing lower bin support rail of the aircraft.

The aircraft overhead luggage bin retrofit assemblies of the invention provide the increased overhead luggage bin capacity needed to meet the carry-on luggage requirements of modern-day air travel passengers while at the same time significantly reducing the cost of retrofitting existing aircraft.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, all of which are schematic and not to scale, wherein:

FIG. 3 is a schematic end view of an alternate embodiment of a retrofit side luggage bin and mounting assembly according to the invention;

FIG. 6A is a cross-section taken at 6A—6A of FIG. 6;

DETAILED DESCRIPTION OF THE PREFERRED EMBODIMENTS

The invention provides several preferred embodiments of an aircraft overhead luggage bin retrofit assembly that is compatible with existing bin support structure in a Boeing 747 aircraft cabin and other aircraft using similar support structure. The accompanying schematic drawings illustrate certain embodiments of the invention, but the invention is not limited to these embodiments. However, for ease of explanation, reference may be had to the FIGURES in order to better understand certain features of the invention.

Figure 1:
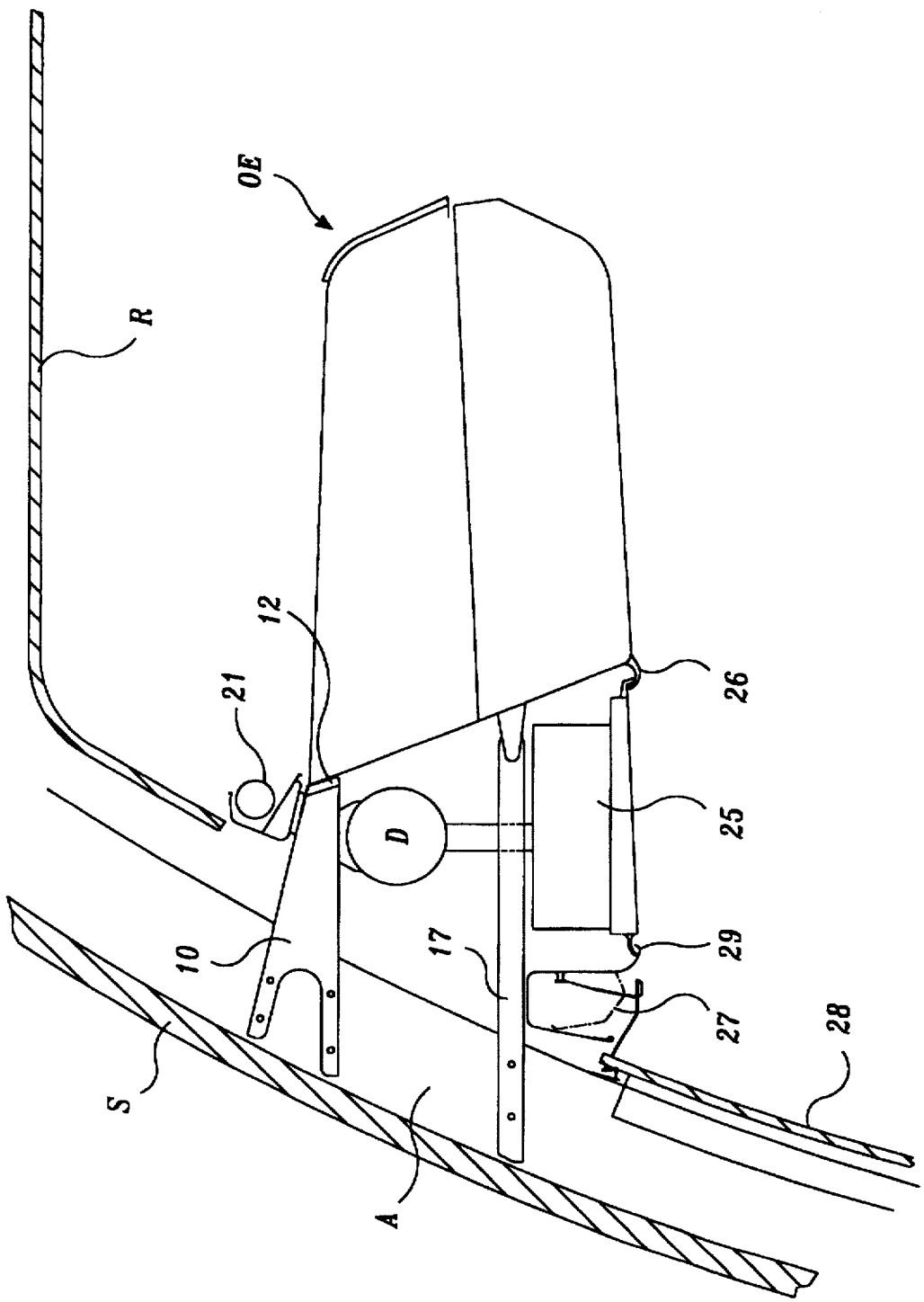
FIG. 1 is a schematic end view showing the existing aircraft side luggage bin support structure and an original equipment luggage bin in place.

As a preliminary matter, it should be noted that an existing aircraft frame includes a structure that is specifically designed to support the original equipment overhead luggage bins. Typically, as shown in FIG. 1, the aircraft includes an outer skin S, of generally cylindrical shape, surrounding an interior space of the aircraft. The skin S is held in place and supported structurally by an aircraft frame A. Support brackets for the overhead bin assembly are then fixedly attached to the aircraft frame A. Thus, a series of upper support brackets 10 are each fixedly attached at one end to aircraft frame A, and extend generally transversely into the interior space of the aircraft so that their farthest, or inboard, ends have bullnoses that are attached to a rail 12 that extends longitudinally along the length of the aircraft. Further, an existing overhead bin support structure also includes a series of second, or lower, support brackets 17 positioned below upper support brackets 10 and also extending from a fixed attachment to the aircraft frame A, into the interior of the aircraft so that the farthest extending ends thereof, the inboard ends, support a rear side of an original equipment overhead luggage bin OE. Typically, the interior sides of the cabin are covered with side wall panels 28 and the interior ceiling R of the aircraft extends from behind and above the original equipment bin, as shown, so that lighting 21 may be located between the ceiling R and the upper surface of the bin. Further, a passenger service unit 25 is usually mounted on a rail on the lower rear edge of bin OE so that its undersurface is generally coextensive with the underside of the bin OE and extends toward the air conditioning duct 27 for supportive attachment thereto. Cold air duct D supplies air to the passenger service unit 25.

In the specification and claims, the term "mechanical attachment" encompasses those methods used and approved in the aircraft industry, including, but not limited to, attachment by nuts and bolts, rivets, screws, threaded bolts into threaded inserts, and adhesive bonding.

In order to install the retrofit luggage bin assemblies of the invention in an aircraft having original side bin support structure substantially as described above, the original equipment bin is first dismantled from the aircraft luggage bin support structure described above and removed. Thereafter, in accordance with the invention, the retrofit side luggage bin, with mounting assembly that is compatible with the existing aircraft bin support structure, is installed.

Figure 2A:
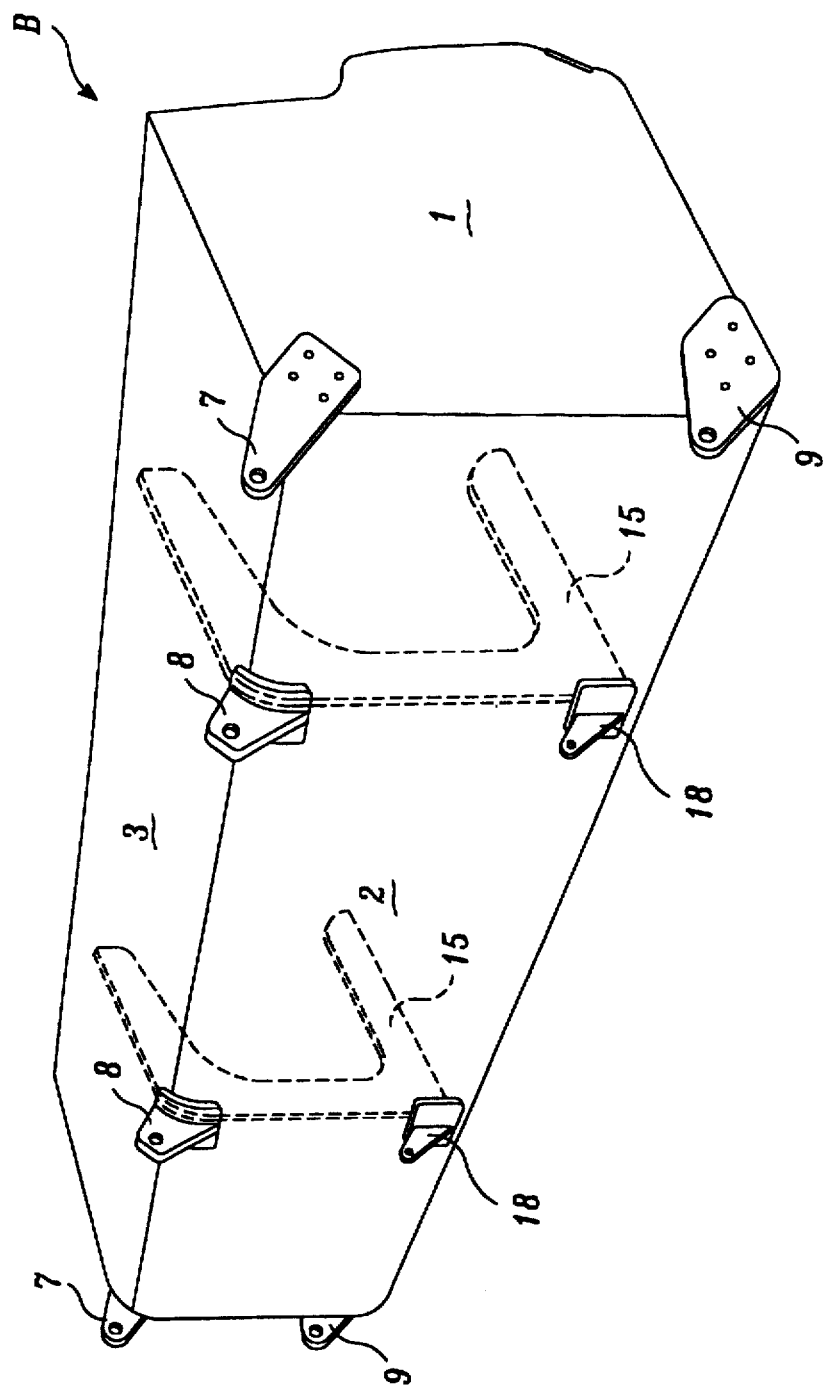
FIG. 2A is a perspective view, showing the rear and parts of the mounting assembly for a retrofit side luggage bin assembly according to the invention.
Figure 2B:
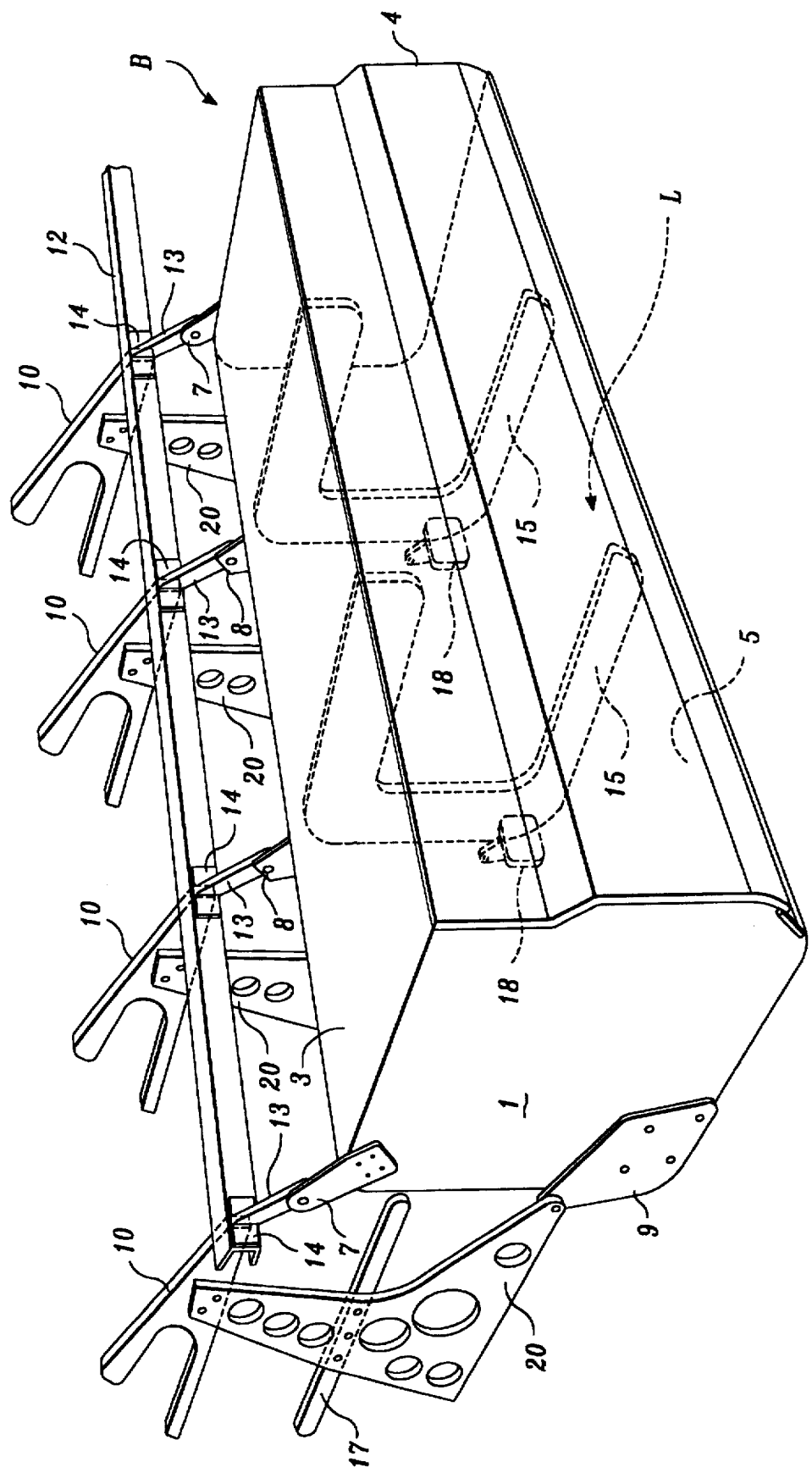
FIG. 2B is a perspective view showing a side and front of a retrofit side luggage bin assembly as installed, according to one embodiment of the invention.

Referring to FIGS. 2A and 2B, a preferred embodiment of a retrofit side luggage bin B has end bulkheads 1, a rear side 2, a top side 3, and a base or underside 5. Further, referring to FIG. 2C, a front side of the bin B is equipped with a door 4 with hinge 23 and latch 24 for closing the door 4. The base 5 slopes gently downward away from the door 4 so that luggage placed within the storage space will have a tendency to lean against the rear side 2, and a reduced tendency to spill from the front of the bin, when door 4 is opened.

Replacement side luggage bin B is equipped with a unique mounting assembly that includes several support brackets, which are compatible with, and which cooperate with, existing bin support structure of a Boeing 747 aircraft. Thus, upper end support brackets 7 mechanically attach to and extend from the upper rear of bin B, preferably one on each bulkhead 1, and upper intermediate brackets 8 are mechanically attached to the bin B at intervals described above, depending upon bin size and the mass of luggage it is expected to support when in use. Thus, larger bins carrying heavier loads would have upper intermediate brackets 8 mechanically attached at intermediate bulkheads 15 that are spaced shorter distances apart, for example, 40 inches, to provide support. Smaller bins, carrying lighter loads, on the other hand, would have upper intermediate brackets 8 at longer spacings, for example, 80 inches. An upper bin support bracket 7, mechanically attached to a bulkhead 1 of bin B, for example by a series of fasteners 6, extends rearward of the bin B to terminate in an end that is adapted to mechanically cooperate with tongue 13 of a rail-cooperating bracket 14. Rail-cooperating bracket 14 in turn is mechanically attached to a rail 12, which may be the existing rail that extends between upper support brackets 10, or a reinforced replacement rail, depending upon the size and capacity of bin B.

Intermediate upper bin support brackets 8 extend rearward from the bin B and are adapted for mechanical attachment to angled brackets 14, which are in turn mechanically attached to the rail 12. Thus, the upper section of the bin B is supported from upper bin end support brackets 7, as well as intermediate upper bin support brackets 8, in the case of the larger bins. Preferably, the rail cooperating brackets 14 are mechanically attached to the rail 12 at points coincident with the rail's attachment to support brackets 10, as shown in FIG. 2B. Depending upon bin loading and sizing, however, the bin attachment may also be made on the rail 12 between the existing upper support brackets 10.

Figure 2C:
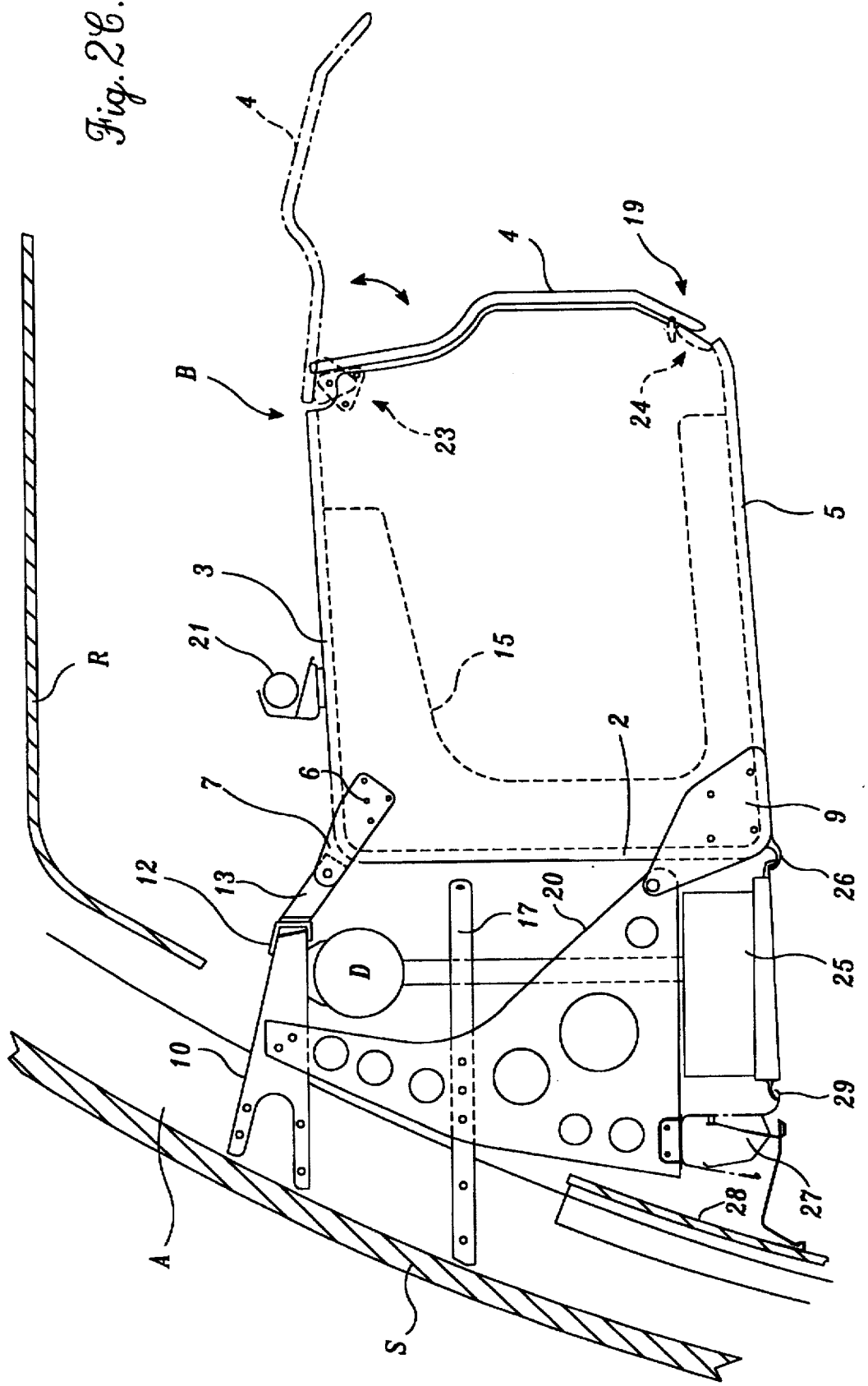
FIG. 2C is a schematic end view of an embodiment of a retrofit side luggage bin assembly, as mounted on existing bin support structure according to the invention.

The bin also has lower end stabilizing brackets 9 that are mechanically affixed to the rear side 2 of bulkhead 1 of the bin B, as shown in FIG. 2A, and which extend and project rearwardly from the bin B. The end stabilizing brackets 9 extend up to new vertical support brackets 20 and are mechanically affixed thereto, as shown in FIGS. 2B and 2C. Moreover, lower intermediate support brackets 18, shown in FIG. 2A, are spaced at intervals and coincident with intermediate bin bulkheads 15 to provide support. The spacings between intermediate bin bulkheads 15 are determined by the bin size and capacity considerations, as described above. The lower intermediate brackets 18 extend rearward of the bin and are adapted for mechanical attachment to vertical brackets 20, in substantially the same manner as end stabilizing brackets 9. While one bracket assembly has been described, the assembly is duplicated at intervals along the length of the bin at support locations, as shown in FIG. 2B.

As a result of installation of the retrofit side luggage bin assembly, the passenger service units 25 and air conditioning ducts 27 must be relocated, as shown, for instance, in FIG. 2C. Thus, the inboard end of the passenger service unit 25 is mounted on a rail 26 extended onto and along the lower end of rear side 2 of luggage bin B. The outboard edge of the passenger service unit 25 is mounted on existing rail 29 on the inboard edge of air conditioning duct 27, which is supported by attachment to new vertical support bracket 20. This vertical bracket 20 is in turn mechanically fixedly attached to existing lower support bracket 17 and existing upper support bracket 10, as shown.

With reference to FIG. 3, an alternative preferred embodiment, the single vertical bracket 20 of the mounting assembly is replaced with two brackets: an elongate vertical support bracket 16 and a transverse bracket 11. Thus, bracket 16 has an upper end adapted for fixed attachment to existing upper support bracket 10, a midportion for attachment to existing lower support bracket 17, and a lower end adapted for mechanical attachment to air conditioning duct 27 for supporting the passenger service unit and duct. Bracket 11 is adapted for mechanical attachment of one end to existing lower support bracket 17 and of the other end to a rearward extending portion of lower support bracket 9 or intermediate lower support brackets 18 for further bin support between bin ends 1.

Figure 4:
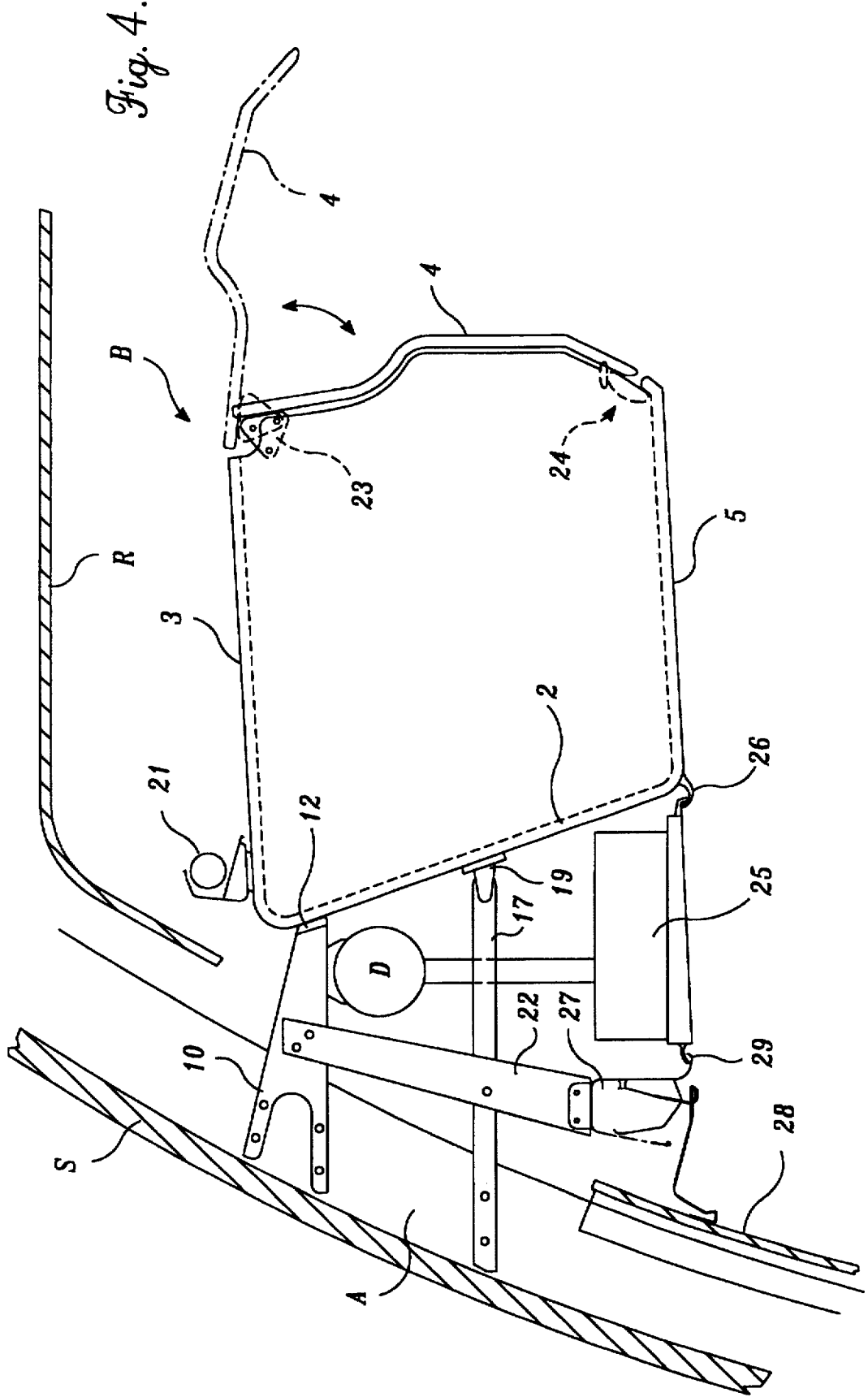
FIG. 4 is a schematic end view of an alternate embodiment of a retrofit side luggage bin and mounting assembly according to the invention.

With reference to FIG. 4, in this alternative more preferred embodiment of a retrofit side luggage bin and mounting assembly, according to the invention, fewer support brackets are needed to hold the bin B in place. This embodiment is most suited for smaller bins B of lower capacity that require less support. Thus, in this embodiment, rail 12 is mechanically attached to a rear portion of bin B, preferably directly. An angled extension support piece 19 with a nose portion is attached to the inboard end of existing lower support bracket 17. A flat flange at the inboard end of the nose portion of the support piece 19 abuts, and is mechanically fastened to, the rear side 2 of bin B. Passenger service unit 25 is relocated behind the replacement bin, preferably with its base plate flush with the base of the bin, as shown. Air conditioning duct 27 supports the outboard edge of passenger service unit 25 and is in turn supported by mechanical attachment to an end of a new substantially vertical elongate support bracket 22. Bracket 22 is adapted to be anchored, by mechanical attachment, to existing lower support bracket 17 at about its midpoint and to upper support bracket 10 at its upper end. Thus, this simplified embodiment eliminates the need for stabilizing brackets 9 and lower intermediate support brackets 18. In certain instances, however, stabilizing and lower intermediate brackets may also be used, as necessary. Since this simplified embodiment of the retrofit luggage bin assembly of the invention requires a less complex mounting assembly, it is expected that this retrofit assembly would be easier and less time-consuming to install, thereby allowing greater cost savings.

Figure 5:
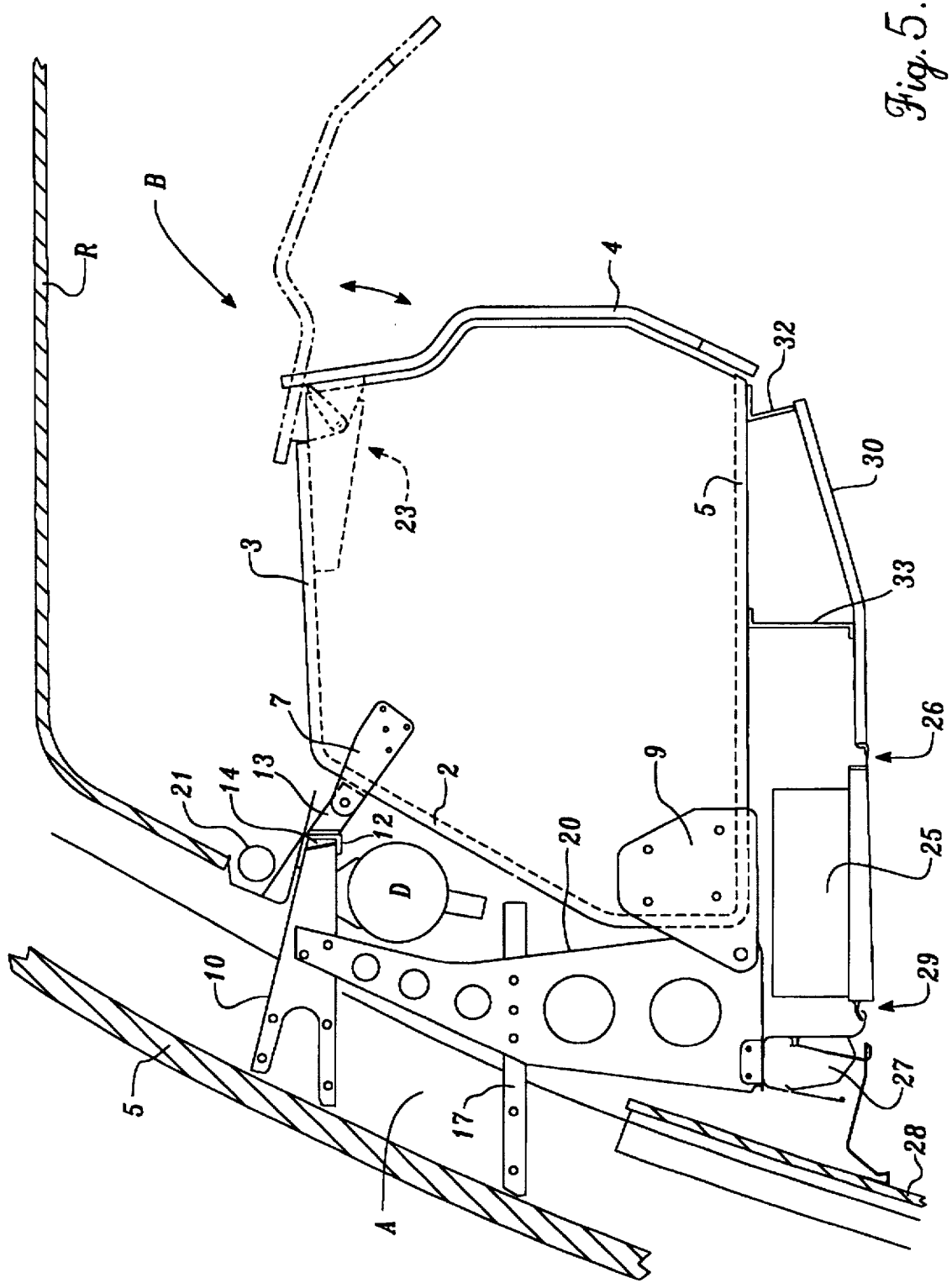
FIG. 5 is a schematic end view of an alternate embodiment of a retrofit side luggage bin and mounting assembly according to the invention.

A most preferred embodiment of the retrofit luggage bin of the invention is shown in FIG. 5. In this embodiment, the luggage bin B has an angled rear side 2 to allow the bin to be mounted closer to the aircraft frame A without interference with cold air duct D and other equipment, thereby allowing more passenger space in an aisle inboard of the bin. Additionally, the passenger service unit 25 is located beneath the bin, rather than alongside the bin, thereby also allowing the bin to be mounted further outboard and increasing space for passenger movement in the aisle. Referring to FIG. 5, the retrofit luggage bin B has an upper bin support bracket 7 mechanically affixed to a bulkhead of bin B, for example, by a series of fasteners. Bracket 7 extends rearward of the bin to terminate in an end that is adapted to mechanically cooperate with a rail-cooperating bracket 14, which is mechanically coupled to longitudinal rail 12 that extends between longitudinally spaced-apart existing upper support brackets 10. This arrangement provides support for the upper end of replacement bin B. A lower bin support bracket 9 is mechanically affixed to the lower rear portion of bin B, for instance at the bin end bulkhead, and has an end portion extending outboard for attachment to a vertical support bracket 20. Vertical support bracket 20 has an upper end fixedly attached to existing upper support bracket 10, and a midportion fixedly attached to existing lower support bracket 17. Thus, the lower rear end of bin B is effectively supported by both upper and lower existing support brackets, by means of vertical support bracket 20. An inboard extending end portion of lower support bracket 17 is trimmed away to clear the back of the bin. Thus, the replacement luggage bin B is preferably supported by the existing upper and lower support brackets and a new vertical support bracket, at least at two points near the rear of the bin at bulkhead locations. The support structure shown in FIG. 5 is duplicated at both bulkheads of each replacement bin B, and at intermediate bulkheads, if required, as explained below.

The replacement bin B may also be supported at intermediate positions, between the end bulkheads 1, by the use of intermediate bin bulkheads 15 with upper 8 and lower 18 intermediate support brackets, as shown for example in FIGS. 2A and 2B. Thus, intermediate bin bulkheads may be spaced at predetermined intervals, to coincide with the spacings of existing upper support brackets 10. Upper intermediate bin support brackets 8 have an end mechanically affixed to an upper rear end of bin B and extend rearward for mechanical attachment to rail-cooperating bracket 14. Likewise, intermediate lower support bracket 18 has one end mechanically attached to the rear of replacement bin B, in the vicinity of the intermediate bin bulkhead 15, and another end extending outboard for attachment to a lower end of vertical support bracket 20. Vertical support bracket 20, as indicated before, has an upper end mechanically affixed to existing upper support bracket 10, and a midportion mechanically affixed to existing lower support bracket 17.

The embodiment of the replacement bin assembly shown in FIG. 5 is equipped with a hinged door 4 at an inboard-facing side. The door is equipped with a hinge 23 near its upper edge so that it may be opened upwardly to allow placement of luggage inside the bin. As indicated before, the passenger service unit 25 is mounted below the bin B. As shown in FIG. 5, a horizontal rectangular facing panel 30 is spaced below base 5 of replacement bin B and has an inboard edge mechanically attached near the front of the bin base by a spacer rail 32 that extends along the length of the bin. The panel is also mechanically attached to a second spacer rail 33, that extends parallel to, and is spaced outboard of rail 32, for support. An outboard edge of the panel 30 supports the passenger service unit by supporting rail 26, which extends along the bin length. An outboard edge of the passenger service unit is mounted on existing rail 29, on the inboard edge of air conditioning duct 27. Air conditioning duct 27 is supported by attachment to the lower portion of new vertical support bracket 20, discussed above.

The invention also provides replacement centerline bins that utilize the existing support structure for original equipment bins. In order to better appreciate the invention, the existing bins and support structure will be briefly discussed with reference to FIG. 6. The existing bin support structure includes a centrally mounted box beam assembly CB that is supported by suspension from the roof R by intermediate bulkheads 47, and that extends longitudinally along the cabin. The rectangular box beam assembly is made up of an array of four parallel rails, one at each corner of the box beam assembly, each of the rails extending substantially along the length of the aircraft cabin. The upper pair of rails 43 and the lower pair of rails 44 are interconnected at spaced intervals by vertical rectangular bulkheads 45 that are attached at upper corners to the upper rails and at lower corners to the lower rails. Thus, the upper rails suspendingly support the lower rails by means of the rectangular bulkheads. At spaced intervals, the upper rails 43 are mechanically affixed to lower corners of upper vertical intermediate rectangular bulkheads 47 that have upper ends mounted to the airframe A through elongate struts 42. Thus, the entire box beam assembly CB is suspended from the airframe.

Since the bin mounting structure is symmetrical, in the sense that centrally mounted bins on the left and right sides of the box beam assembly have the same support structure, for ease of explanation reference will be made to the right side centerline bins. With reference to existing aircraft centerline bins, an upper centerline bin support bracket 40 is mechanically attached to and extends from the upper rail 43 with an outboard extending end mechanically attached to the shroud 50' of the original equipment bin OEM. To prevent luggage from spilling into the box beam assembly, a vertical rear planar panel 54' extends longitudinally between rails 43 and 44. The bucket 60' of the bin OEM is hingedly mounted by hinge 46' to the vertical shroud end bulkheads 63'. The passenger service unit 25' (detail not shown) is mounted directly below the box beam assembly and the planar, horizontal base of the passenger service unit PSB' extends laterally to substantially fill the space between the original equipment bins OEM on either side of the box beam and substantially coextensively with the bases 65' of the bins, to provide an uninterrupted and aesthetically pleasing appearance when viewed by a passenger seated below the bins.

Figure 6:
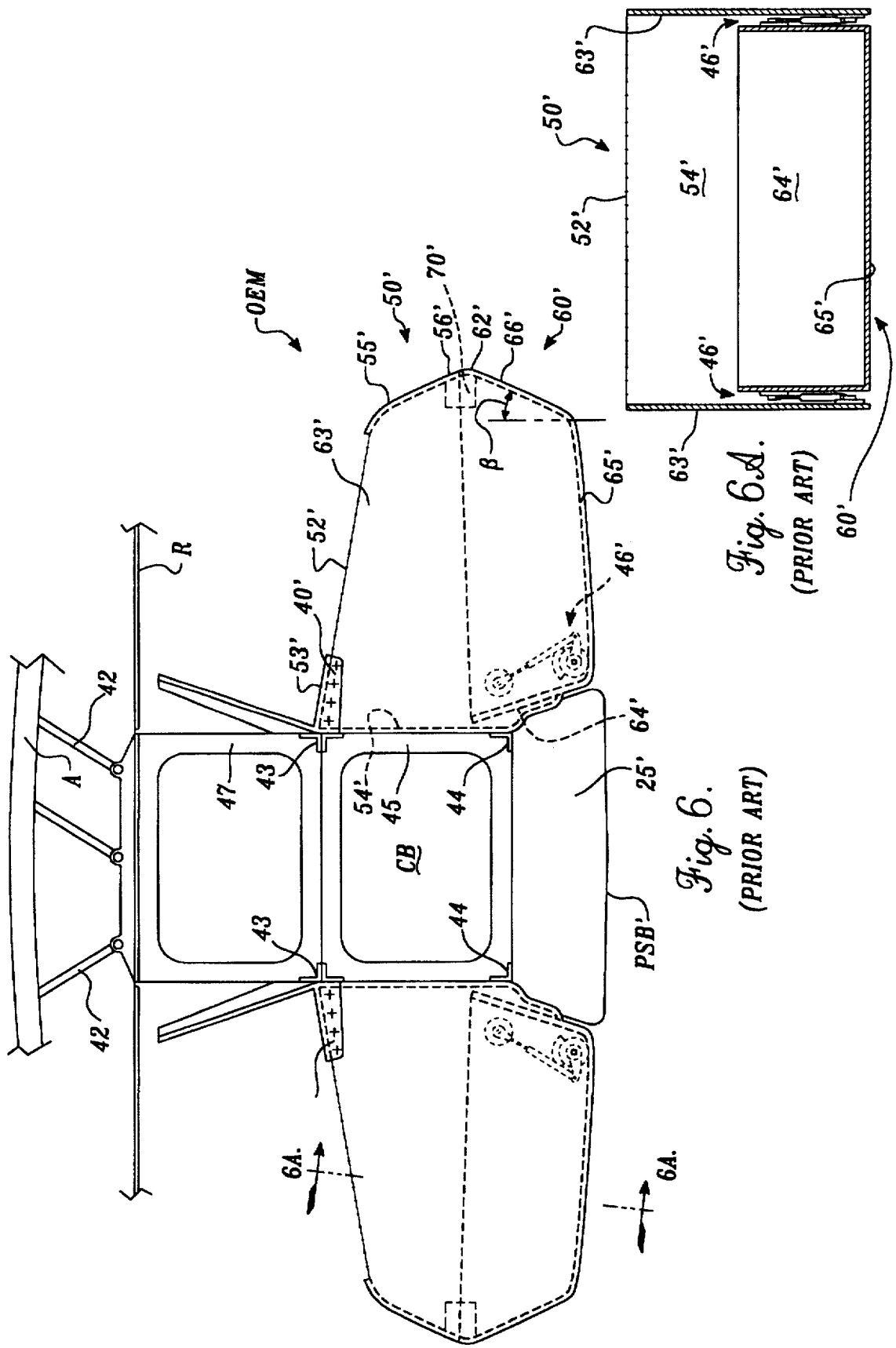
FIG. 6 is a schematic end view of an existing centerline bin assembly.

The shroud 50' of bin OEM extends outboard and slopes gently downward from near the top edge of rear panel 54', as shown in FIG. 6. Structurally, the shroud includes a central section 52' comprised of flexible netting so that, when moderately oversized luggage is placed within the bin OEM, the netting will flex outwardly to accommodate the luggage. Thus, a first upper section 53' of the shroud extending from the rear panel 54' is of solid composite material, a central section 52' is of netting, and a frontal panel 55' is of composite material extending downward to a lower edge 56'. Lower edge 56' mates coextensively with upper edge 62' of bucket 60' when the bin OEM is closed. A rear side 64' of the bucket slopes downward and outboard from an upper rear edge thereof to a bin base 65' that is substantially horizontal, when the bucket is in the closed position. At the outboard, edge base 65' curves upward to form bucket frontal panel 66' that terminates in an upper edge 62'. A latch 70' holds bucket 60' in place when the bin is closed. Importantly, the front panel 66' of the bin is angled outboard at an angle 90°+β to the base 65' of the bin. Thus, when the bin is opened and the bucket moves downward, there is a risk that luggage may slide out of the bin.

Having explained the existing bucket-and-shroud bins, above, the benefits of the invention may now be more readily appreciated. Preferred embodiments of the improved and enlarged centerline bins of the invention are shown schematically in FIGS. 7 and 8. These centerline bins are compatible with the existing mounting structure of the original equipment bins, thereby allowing rapid replacement of the original equipment bins with the larger, more convenient replacement bins. In certain embodiments of the invention, additional brackets are used to allow the replacement bins to be mounted at a lower elevation, thereby allowing greater ease of passenger access to the luggage space within the bins.

Figure 7:
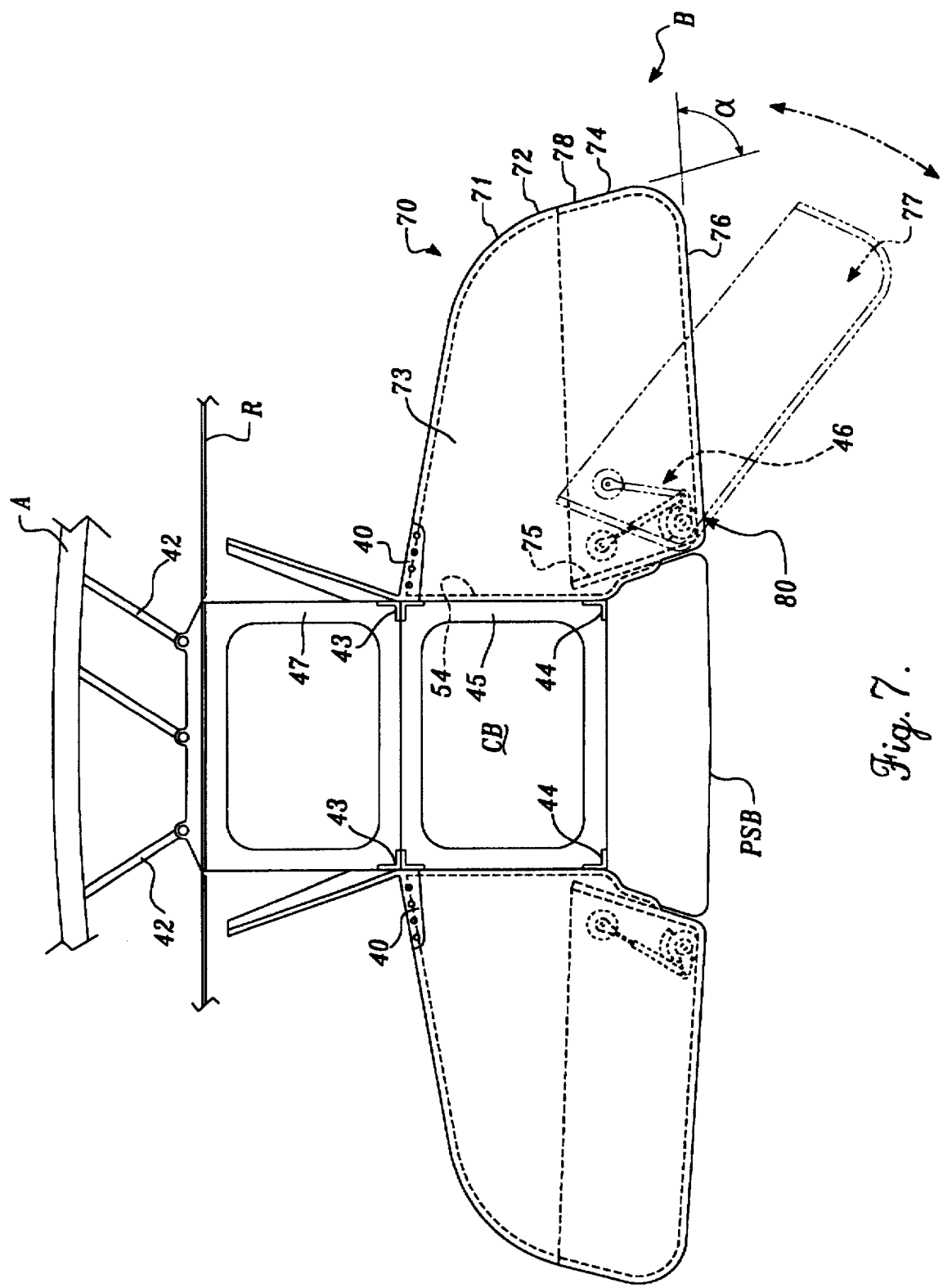
FIG. 7 is a schematic end view of an embodiment of a shroud and bucket retrofit centerline bin assembly of the invention.

In one preferred embodiment of the centerline bins B according to the invention, shown in FIG. 7, the original shroud is replaced with a curved shroud 70 that extends from the central bulkhead inboard, gently sloping downwardly, with a smoothly curving front portion 71 terminating in an edge 72. The shroud does not incorporate a central portion of flexible netting, which has been found in practice to degrade and tear. Instead, the shroud is preferably a structural panel, such as a composite honeycombed panel or a lightweight metal panel. However, the shroud is mounted to the existing upper rail 43, as in the case of the original shroud, through bracket 40. The bucket 74 of the bin B is hingedly affixed to bulkhead 73, as is the case in the original bin, but bin B has a significantly different shape from that of the original bin and provides a safety feature that prevents luggage from inadvertently spilling from the bucket onto passengers when the bin is opened. Thus, the bucket has a substantially planar rear side 75 that extends downward at an angle away from the box beam assembly. The rear side curves outboard at its lowest extremity and extends laterally outboard, thereby forming the base portion 76 of the bucket. At the outboard extremity of the base portion 76, the bucket curves upward and inboard to form a front portion 74 of the bucket. Most preferably, the front portion 74 is inclined inboard at an acute angle α, less than 90°, to the base portion 76. Consequently, when the bucket is opened, front portion 74 does not allow luggage to slide and fall from the bucket, but retains the luggage by providing a catchment space 77, in the angled space between the front surface 74 and the base 76, as shown in FIG. 7.

In yet another embodiment, the existing shroud is retained, and only the bucket is replaced. The replacement bucket is exemplified by the bucket of FIG. 7, being larger than the original bucket (shown in FIG. 6) and preferably having a front panel at an angle or, less than 90°, to the base of the bucket to reduce the risk of luggage spillage from the bin, upon opening of the bin. Moreover, in the preferred embodiment, the base of the bucket is wider than the base of the original bin.

Figure 8:
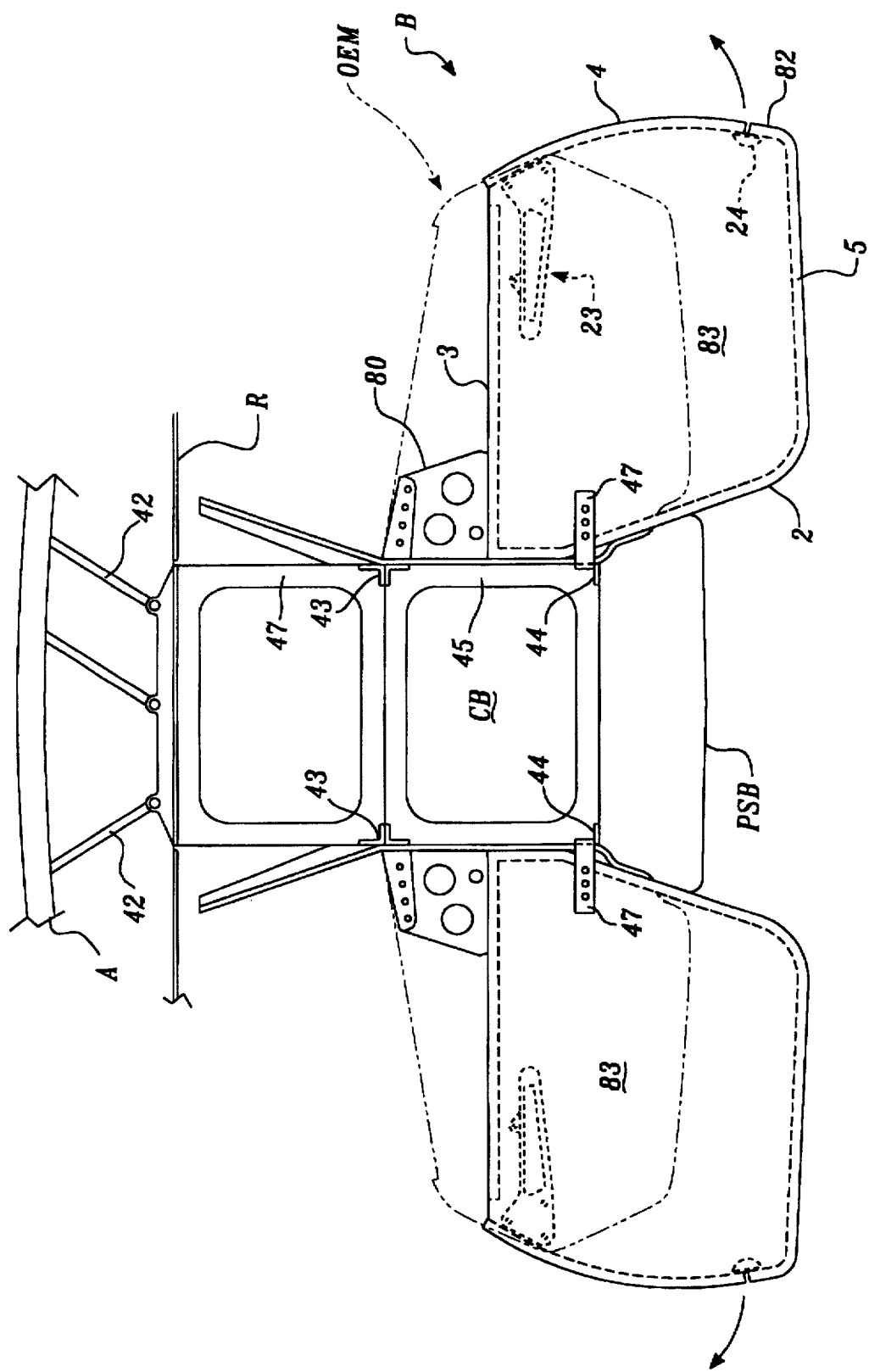
FIG. 8 is a schematic end view of an embodiment of a retrofit centerline bin assembly of the invention.

In an alternative embodiment, the replacement bins of the invention preferably utilize larger fixed shelf-type bins B, with a frontally hinged door, that are preferably mounted at a lower elevation than the original equipment bins OEM, as can be seen in the schematic of a preferred embodiment in FIG. 8. Replacement centerline bins B have end bulkheads 83, with a coextensive planar top 3, rear side 2, and base 5 extending continuously between the end bulkheads. The open front of the centerline bin, facing outboard when the bin is mounted in place, is covered with a door 4 hinged near its upper end by hinge 23 to an end bulkhead of the bin. The door 4 is latched, with a conventional safety latch 24, to an upwardly extending lip 82 formed at the outboard end of base 5. Importantly, this replacement luggage bin, preferably larger than the original equipment bins in volume, is mounted on the existing centerline bin supports of the aircraft. In order to position the bin at a more convenient lower elevation, a new spacer bracket 80 is fixedly attached to existing upper support rail 43 so that a portion of bracket 80 extends downward. The lower end of bracket 80 is preferably mechanically attached to the replacement bin B near the top 3 and rear side 2 of the bin, as shown in FIG. 8. The bin B is also mounted to the existing lower bin support rail 44 by fixed mechanical attachment of brackets 47 which are in turn attached to the end bulkheads 83 of the bin. Thus, the bin is preferably secured, by at least four brackets, to the existing aircraft bin support structure. Because of the lowered elevation of the replacement bin, the base 5 of the bin would no longer be coextensive with the existing passenger service unit base, but would extend below the passenger service unit base. Nevertheless, since the rear side 2 of the bin is designed to fit flush with the sides of the passenger service unit base PSB, the design is aesthetically pleasing, without unsightly gaps, so that the original service unit may be retained in the same location as before. Alternatively, the unit can also be lowered, by use of spacer brackets, and its base widened so that the base extends coextensively between the bases of the replacement bins.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. An aircraft overhead luggage bin retrofit assembly compatible with existing bin support structure in an aircraft cabin, said support structure including existing support brackets mechanically attached to the aircraft frame and extending from sides of the aircraft into the cabin to support original bins fitted to the aircraft, the retrofit assembly comprising:
   (a) a replacement luggage bin comprising a bulkhead at each end thereof; a base, a top, and a rear side, each extending coextensively between the bulkheads to define a containment space for receiving luggage; and a door to allow sealing of the containment space; and
   (b) a mounting assembly for fixedly connecting the replacement luggage bin to the existing bin support structure, the mounting assembly comprising:
      (i) an upper bin support bracket mechanically attached to an upper rear portion of the replacement bin, the upper bin support bracket having an end portion, farthest from the bin, for mechanical attachment to the existing bin support structure of the aircraft;
      (ii) a lower bin support bracket mechanically attached to the bin near a base portion of the rear of the bin, a portion of the lower bin support bracket extending rearwardly from the bin for mechanical attachment to the existing bin support structure of the aricraft.

2. The retrofit assembly of claim 1, further comprising at least one intermediate upper bin support bracket mechanically attached to the bin at a juncture coincident with intermediate bulkheads of the bin, said at least one upper bin support bracket extending rearward from the bin for attachment to a second bracket.

3. The retrofit assembly of claim 2, wherein the second bracket is attached to a rail extending along a length of the aircraft cabin.

4. The retrofit assembly of claim 1, further comprising at least one intermediate lower bin support bracket mechanically attached to a lower portion of the bin at a juncture coincident with intermediate bulkheads of the bin, the intermediate lower bin support brackets extending rearwardly of the bin for attachment to an existing bin support bracket of the aircraft.

5. The retrofit assembly of claim 1, wherein the base of the luggage bin is rearwardly inclined at an angle when the bin is installed, whereby any risk of luggage pressing against the door and spilling from the containment space, when the door is opened, is reduced.

6. An aircraft overhead luggage bin retrofit assembly compatible with existing bin support structure in an aircraft cabin, said support structure including existing bin support brackets mechanically attached to the aircraft frame and extending from sides of the aircraft into the cabin to support original bins fitted to the aircraft, the retrofit assembly comprising:
   (a) a replacement luggage bin comprising end bulkheads at each end thereof, a base, a top, and a rear side, each extending coextensively between the end bulkheads to produce a containment space for receiving luggage; and a door to allow sealing of the containment space; and
   (b) a mounting assembly for fixedly connecting the replacement luggage bin to the existing bin support structure in the aircraft cabin, the mounting assembly comprising:
      (i) a mechanical attachment point on the upper portion of the rear of the bin for mechanical attachment of the bin to the existing support structure of the aircraft that is adapted for supporting an original bin; and
      (ii) an extension bracket, adapted for mechanical attachment to an inboard projecting end portion of an existing lower support bracket of the aircraft, the extension bracket having a nose portion angled for supporting the rear side of the replacement luggage bin, said nose adapted for mechanical attachment to the rear side of the bin.

7. An aircraft overhead luggage bin retrofit assembly compatible with existing bin support structure in an aircraft cabin, said support structure including support brackets mechanically attached to the aircraft frame and extending from sides of the aircraft into the cabin, the retrofit assembly comprising:
   (a) a replacement luggage bin comprising a bulkhead at each end thereof; a base, a top, and a rear side, each extending coextensively between the bulkheads to define a containment space for receiving luggage; and a door to allow sealing of the containment space; and
   (b) a mounting assembly, mechanically attached to the bin, for fixedly connecting the replacement luggage bin to the existing bin support structure of the aircraft frame, the mounting assembly comprising:
      (i) an upper bin support bracket mechanically attached to an upper rear portion of the replacement bin, the upper bin support bracket extending from the rear of the bin and having an end portion, farthest from the bin, for mechanical attachment to the existing support structure of the aircraft;

(ii) at least one intermediate upper bin support bracket, mechanically attached to the bin at a juncture coincident with intermediate bulkheads of the bin, said at least one intermediate upper bin support bracket extending rearward from the bin for attachment to the existing support structure of the aircraft;

(iii) a lower bin support bracket mechanically attached to the bin near a base portion of the rear of the bin, a portion of the lower bin support bracket extending rearwardly from the bin for mechanical attachment to a vertical support bracket;

(iv) at least one intermediate lower bin support bracket mechanically attached to a lower portion of the bin at a juncture coincident with intermediate bulkheads of the bin, the intermediate lower bin support brackets extending rearward of the bin for attachment to a vertical support bracket; and (v) at least one vertical support bracket adapted for mechanical attachment at an upper end thereof to existing upper support brackets of the support structure of the aircraft, and mechanical attachment of a midportion thereof to existing lower support brackets of the support structure of the aircraft, and mechanical attachment of a lower portion thereof to the rearward vertical extending portion of lower bin support brackets.

8. The retrofit assembly of claim 7, wherein the upper bin support bracket is attached to a rail extending along a length of the aircraft cabin.

9. The retrofit assembly of claim 8, wherein the base of the luggage bin is rearwardly inclined at an angle when the bin is installed, whereby any risk of luggage pressing against the door and spilling from the containment space, when the door is opened, is reduced.

10. An aircraft overhead centerline bin retrofit assembly compatible with existing bin support structure in an aircraft cabin, the support structure including a box beam assembly centrally mounted to the aircraft frame, the box beam assembly extending longitudinally along the cabin, with upper and lower support brackets extending outboard from said box beam assembly; the bin retrofit assembly comprising:

(a) a replacement fixed shelf-type centerline luggage bin having a bulkhead at each end thereof, the bin having a base, a top, and a rear side, each extending coextensively between the bulkheads to produce a containment space for receiving luggage; and (b) a mounting assembly for fixed mechanical attachment of the replacement luggage bin to the existing bin support structure, the mounting assembly comprising:

(i) a spacer bracket having a portion thereof attached to the replacement centerline bin in the vicinity of the top of said bin, and another portion of the spacer bracket adapted for fixed mechanical attachment to one of the existing upper support brackets extending from the sides of the bulkheads; and (ii) a bracket on the rear side of the replacement luggage bin for mechanical attachment of said rear side of said bin to a lower portion of the existing box beam assembly;

wherein, when the assembly is fitted to the existing bin support structure of an aircraft, the base of the replacement centerline bin is at a lower elevation than the original bin.

11. The assembly of claim 10, wherein the spacer bracket is a substantially planar polygon with an upper portion thereof adapted for fixed mechanical attachment to one of existing upper bin support brackets adapted for supporting originally installed bins, and a lower end portion thereof attached to the replacement luggage bin.

12. The assembly of claim 10, wherein the replacement luggage bin further comprises a hinged door for enclosing the containment space for receiving luggage.

13. The assembly of claim 10, wherein a portion of the rear side of the replacement bin is angled away from the existing central bulkhead to allow space for a passenger service unit, when the bin is installed.

14. The assembly of claim 10, wherein the top of the replacement bin comprises a thin continuous relatively rigid honeycombed composite material.

15. A replacement luggage bin adapted to replace original equipment centerline bins in an aircraft and equipped with mounting brackets that cooperate mechanically with existing bin support structure of the aircraft, the replacement centerline luggage bin comprising:

an upper shroud portion;

a lower enlarged cooperating bucket portion, upwardly and downwardly rotatable about a hinge relative to the shroud, to close and open the luggage bin; and at least a pair of means for mounting the replacement bin directly to the existing centerline bin support structure of the aircraft.

16. The replacement bin of claim 15, wherein the upper shroud comprises a structural panel.

17. The replacement bin of claim 16, wherein an upper surface of the shroud portion has a smooth curvature forward and downward from a rear of the shroud to a front edge, the front edge aligned with an upper edge of the lower bucket portion so that the smooth curvature of the shroud portion continues to a frontal surface of the bucket portion.

18. The replacement bin of claim 17, wherein the shroud comprises a structural panel of honeycombed composite material.

19. The retrofit assembly of claim 1, wherein the end portion farthest from the bin of the upper bin support bracket (i) is adapted for mechanical attachment to a rail extending longitudinally along the cabin, the rail comprising a part of the existing bin support structure of the aircraft.

20. The retrofit assembly of claim 1, wherein the portion of the lower bin support bracket (ii) extending rearwardly is adapted for mechanical attachment to a vertical bracket, the vertical bracket adapted for attachment to the existing bin support structure of the aircraft.

21. The retrofit assembly of claim 4, wherein the rearwardly extending intermediate lower bin support brackets are mechanically attached to a vertical bracket, the vertical bracket adapted for attachment to the existing bin support structure of the aircraft.

22. The retrofit assembly of claim 7, further comprising at least one second vertical bracket, the at least one second vertical bracket adapted for attachment at an upper end thereof to the existing bin support structure of the aircraft, and attachment of a lower portion thereof to the rearward extending intermediate lower bin support bracket.

* * * * *

UNITED STATES PATENT AND TRADEMARK OFFICE
CERTIFICATE OF CORRECTION

PATENT NO. : 5,716,027
DATED : February 10, 1998
INVENTOR(S) : J.E. Hart et al.

It is certified that error appears in the above-identified patent and that said Letters Patent is hereby corrected as shown below:

COLUMN      LINE

On the title page, item [56]:     Please insert the following text:
--Any term of this patent extending beyond the term of U.S. Patent No. 5,549,258 has been disclaimed.--

Pg. 1     Refs. Cited (U.S. Pat. Docs.)     Please insert the following references:
--4,907,762    3/1990    Bock et al.
4,947,762    8/1990    Perzl et al.
5,108,048    4/1992    Chang
5,129,597    7/1992    Manthey et al.
5,395,074    3/1995    Hart et al.--

Pg. 1     Refs. Cited (Foreign Pat. Docs.)     Please insert the following reference:
--0 614 806 A1    9/1994    European--

Pg. 1     Refs. Cited (Other Publications)     Please insert the following reference:
--O'Lone, Richard G., *Aviation Week & Space Technology*, April 28, 1969, pp. 32 and 33.--

11     67     "aricraft." should read --aircraft.--
(Claim 1, line 25)

13     53     Further indent the paragraph beginning with "(i) a spacer bracket . . ." to read as a subparagraph of "(b)" which immediately precedes it.
(Claim 10, line 17)

UNITED STATES PATENT AND TRADEMARK OFFICE
CERTIFICATE OF CORRECTION

PATENT NO. : 5,716,027
DATED : February 10, 1998
INVENTOR(S) : J.E. Hart et al.

It is certified that error appears in the above-identified patent and that said Letters Patent is hereby corrected as shown below:

| COLUMN | LINE | |
|---|---|---|
| 13 (Claim 10, | 60 line 23) | Further indent the paragraph beginning with "(ii) a bracket on . . ." to read as a subparagraph of "(b)" two paragraphs above it. |

Signed and Sealed this

Seventh Day of September, 1999

Attest:

Q. TODD DICKINSON

Attesting Officer    Acting Commissioner of Patents and Trademarks